United States Patent Office 2,940,494
Patented June 14, 1960

2,940,494
APPARATUS FOR BRUISING GREEN FODDER

Herbert Vissers, Nieuw-Vennep, Netherlands, assignor to Landbouwwerktuigen-en Machinefabriek H. Vissers N.V., Nieuw-Vennep, Netherlands Filed Nov. 28, 1958, Ser. No. 776,886

Claims priority, application Netherlands Dec. 5, 1957

1 Claim. (Cl. 146—186)

This invention relates to an apparatus for bruising green fodder and also for comminuting such fodder, if desired. Apparatus of this kind is known in which the casing is provided with an inlet opening, a discharge opening and a pair of conveying screws rotating in opposite directions and having their helical ribs not meshing with each other. At least one grid is arranged at the delivery end of the casing between said screws and said discharge opening.

Apparatus for this kind is used for treating grass and similar long stalk material to be ensiled. With such an apparatus it is important that the conveying screws are regularly fed with material since otherwise some form of auxiliary feeding means is required.

The object of the present invention is to provide a continuous, even flow of fodder to the conveying screws without the necessity of employing auxiliary feeding means such as a rotating shaft with a plurality of radial arms or a pair of ribbed rollers positioned above the screws. In accomplishing the object of the invention the conveying screws are each provided with a helical rib of a varying degree of pitch, which near the discharge end of the screws is less than one quarter as great as the degree of pitch at the material receiving end of the screws. The purpose of such an arrangement is to provide adequate conveying characteristics to the screws at their receiving ends where the slope of the ribs is greatest and to provide adequate pushing characteristics at the discharge ends where the degree of slope is comparatively slight. With the screws rotating in opposite directions, the incoming fodder is readily grasped by the ribs and advanced toward the discharge opening where it is forced through a grid, thereby bruising the stalks as desired.

Figure 1:
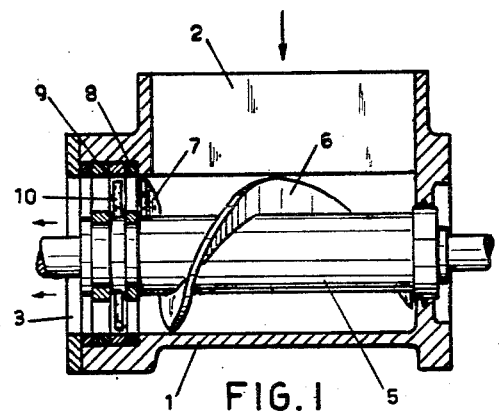
Figure 2:
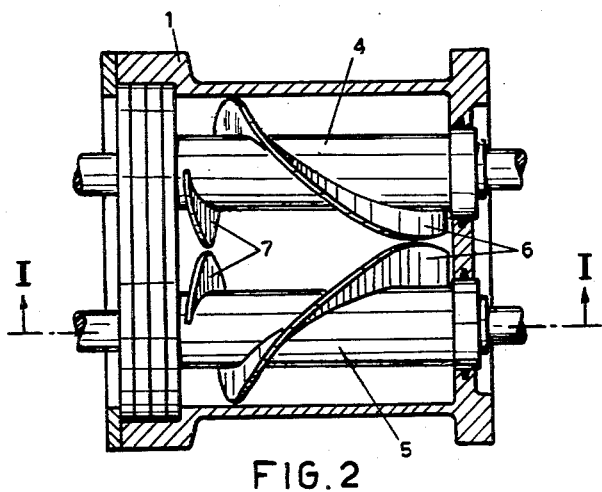

In the accompanying drawing which illustrates an embodiment of the conveying screws according to the invention, Fig. 1 is a schematic sectional elevation taken on line I—I of Fig. 2.

Fig. 2 is horizontal section of the apparatus. In the casing 1, which has an inlet opening 2 and a discharge 3 opening, two conveying screws 4, 5 are mounted.

Each screw is provided with a helical rib 6, having its greatest pitch in the area where it underlies the inlet opening 2 of the casing, said pitch decreasing to a pitch of much smaller degree near the delivery end of the casing. The pitch of the portion 7 of the helical rib is less than a quarter as great as the degree of pitch of the first portion 6 of the rib. The screws 4 and 5 are driven in such a manner that they rotate in opposite directions.

Between the outlet 3 and the screws 4, 5 two grids 8 and 9 are arranged and the innermost grid 8 is located closely adjacent the inlet opening 2. The bars of the grids which may be radially directed, may be sharp on their sides facing the inlet opening 2, so that the material is not only bruised, but also cut. To provide for additional cutting of the material, knives 10 may be secured on the shaft of each screw 4 and 5.

As the grid 8 is located a short distance from the inlet opening 2, the material caught by the screws 4 and 5 is regularly forced through the grids 8 and 9, so that there is no clogging of fodder around the conveyor screws.

As the screws are rotating in opposite directions and, since their helical ribs are oppositely wound, the material lying in the inlet opening 2 will be caught between the ribs 6 and forced through the grids 8 and 9 by the rib portions 7. Although the screws 4, 5 are shown in the drawing with their ribs 6, 7 exactly symmetrical the screws may also be rotated through a small angle relatively to each other.

What I claim is:

An apparatus for bruising green fodder, comprising a casing having an inlet opening and a discharged opening, a pair of conveyor screws mounted in said casing for rotation in opposite directions to each other, said screws arranged in side by side relationship and lying beneath said inlet opening and in axial alignment with said discharge opening, oppositely wound helical ribs on each of said screws, the pitch of said ribs at the end adjacent said discharge opening being substantially vertical and less than one-fourth of the degree of pitch of said ribs at their opposite ends, at least one grid member secured in the throat of said discharge opening adjacent said substantially vertical ribs whereby upon rotation of said screws the fodder fed through said inlet opening is grasped and evenly conveyed to said discharge opening where it is forced through said grid member by the ribs of lesser pitch to obtain the desired bruising of said fodder.

References Cited in the file of this patent

UNITED STATES PATENTS

| 1,465,941 | Hill | Aug. 28, 1923 |

FOREIGN PATENTS

| 465,206 | France | Jan. 31, 1914 |